United States Patent
Nakamura et al.

(10) Patent No.: US 10,023,750 B2
(45) Date of Patent: Jul. 17, 2018

(54) AQUEOUS HYDROPHILIZING SURFACE TREATMENT AGENT, HYDROPHILIC COATING FILM AND HYDROPHILIZING SURFACE TREATMENT METHOD

(71) Applicant: Nihon Parkerizing Co., Ltd., Tokyo (JP)

(72) Inventors: Yusuke Nakamura, Tokyo (JP); Tomohiro Endo, Tokyo (JP); Hidehiro Yamaguchi, Tokyo (JP)

(73) Assignee: NIHON PARKERIZING CO., LTD., Tokyo (JP)

( * ) Notice: Subject to any disclaimer, the term of this patent is extended or adjusted under 35 U.S.C. 154(b) by 225 days.

(21) Appl. No.: 14/786,344

(22) PCT Filed: Apr. 23, 2014

(86) PCT No.: PCT/JP2014/061491
§ 371 (c)(1),
(2) Date: Oct. 22, 2015

(87) PCT Pub. No.: WO2014/175357
PCT Pub. Date: Oct. 30, 2014

(65) Prior Publication Data
US 2016/0068687 A1   Mar. 10, 2016

(30) Foreign Application Priority Data

Apr. 26, 2013 (JP) ................................. 2013-093868

(51) Int. Cl.
| C09D 5/08 | (2006.01) |
| C09D 7/40 | (2018.01) |
| C09D 7/61 | (2018.01) |
| C09D 183/02 | (2006.01) |
| C23C 22/74 | (2006.01) |
| F28F 19/04 | (2006.01) |
| B05D 1/40 | (2006.01) |
| B05D 3/02 | (2006.01) |
| C23C 22/83 | (2006.01) |
| C23C 18/12 | (2006.01) |

(52) U.S. Cl.
CPC ............... *C09D 5/08* (2013.01); *B05D 1/40* (2013.01); *B05D 3/0272* (2013.01); *C09D 5/082* (2013.01); *C09D 7/61* (2018.01); *C09D 7/68* (2018.01); *C09D 183/02* (2013.01); *C23C 18/122* (2013.01); *C23C 18/127* (2013.01); *C23C 18/1241* (2013.01); *C23C 18/1254* (2013.01); *C23C 22/74* (2013.01); *C23C 22/83* (2013.01); *F28F 19/04* (2013.01); *C23C 2222/20* (2013.01); *F28F 2245/02* (2013.01)

(58) Field of Classification Search
None
See application file for complete search history.

(56) References Cited

U.S. PATENT DOCUMENTS

| 4,144,074 A * | 3/1979 | Itoh .................. C04B 28/24 106/1.17 |
| 7,588,801 B2 * | 9/2009 | Endo .................. C09D 5/084 148/240 |
| 7,811,670 B2 * | 10/2010 | Ragunathan ........... B82Y 30/00 252/388 |
| 9,534,132 B2 * | 1/2017 | Osako ................. C09D 129/04 |
| 2006/0191671 A1 | 8/2006 | Boger et al. |
| 2010/0167066 A1 | 7/2010 | Yoo et al. |
| 2012/0088106 A1 * | 4/2012 | Jing .................... B82Y 30/00 428/426 |
| 2012/0091397 A1 * | 4/2012 | Foscante ............... C09D 5/084 252/389.2 |
| 2013/0045387 A1 * | 2/2013 | Chu .................... C09D 1/00 428/410 |
| 2015/0218351 A1 | 8/2015 | Jing et al. |

(Continued)

FOREIGN PATENT DOCUMENTS

| CN | 101768381 A | 7/2010 |
| CN | 101941001 A | 1/2011 |
| DE | 102004011545 A1 | 10/2004 |

(Continued)

OTHER PUBLICATIONS

Machine translation of CN 102257178 (no date).*
SNOWTEX product data sheet (no date).*
Machine translation of KR 10-2011-0072848 into English (no date).*
Extended European Search Report dated Dec. 1, 2016, issued by the European Patent Office in related European Patent Application No. EP-14788792.1 (6 pages).

(Continued)

*Primary Examiner* — Marc S Zimmer
(74) *Attorney, Agent, or Firm* — Osha Liang LLP

(57) ABSTRACT

A water-based surface treatment agent includes an organic-inorganic silicon compound (A) and inorganic particle (B), wherein the organic-inorganic silicon compound (A) is adapted to be a compound that is obtained by mixing a colloidal silica (C) and an organoalkoxysilane (D). In this regard, the ratio ($M_B/M_A$) between the solid content mass $M_A$ of the organic-inorganic silicon compound (A) and the solid content mass $M_B$ of the inorganic particle (B) preferably falls within the range from 0.2 or more and 2.0 or less, the average particle size of the organic-inorganic silicon compound (A) preferably falls within the range of 3 nm or more and 500 nm or less. In addition, the average particle size of the inorganic particle (B) preferably falls within the range of 10 nm or more and 600 nm or less.

15 Claims, No Drawings

(56) References Cited

U.S. PATENT DOCUMENTS

2016/0115342 A1* 4/2016 Kawakami .............. C09D 5/02
428/447

FOREIGN PATENT DOCUMENTS

| | | |
|---|---|---|
| EP | 2208808 A1 | 7/2010 |
| JP | 58-126989 A | 7/1983 |
| JP | 59-013078 A | 1/1984 |
| JP | 63-000372 A | 1/1988 |
| JP | 05-214273 A | 8/1993 |
| JP | H06-228459 A | 8/1994 |
| JP | 2002-011827 A | 1/2002 |
| JP | 2004315730 A | 11/2004 |
| JP | 2010-090461 A | 4/2010 |
| JP | 2011111558 A | 6/2011 |
| KR | 10-2011-0072848 * | 6/2011 |
| WO | 2010/041652 A1 | 4/2010 |
| WO | 2010/070728 A1 | 6/2010 |

OTHER PUBLICATIONS

Office Action issued in corresponding Japanese Application No. 2015-513819 with English translation dated Aug. 23, 2016 (11 pages).
Office Action issued in corresponding Korean Application No. 10-2015-7032174 with English translation dated Sep. 20, 2016 (11 pages).
Office Action issued in corresponding Chinese Application No. 201480022932.4 with English translation dated Sep. 26, 2016 (16 pages).
Office Action issued in Chinese Patent Application No. 201480022932.4 dated May 19, 2017 (16 pages).
English translation of the International Preliminary Report on Patentability and Written Opinion issued Oct. 27, 2015, by The International Bureau of WIPO, Geneva, Switzerland, in related International Application No. PCT/JP2014/061491 (6 pages).
International Search Report issued in corresponding application No. PCT/JP2014/061491 dated Jul. 29, 2014 (3 pages).
Office Action issued in Chinese Patent Application No. 201480022932.4 dated Jan. 3, 2018 (17 pages).

* cited by examiner

AQUEOUS HYDROPHILIZING SURFACE TREATMENT AGENT, HYDROPHILIC COATING FILM AND HYDROPHILIZING SURFACE TREATMENT METHOD

CROSS REFERENCE TO RELATED APPLICATIONS

This is a national stage application of PCT/JP2014/061491, filed on Apr. 23, 2014, which claims priority to Japanese Patent Application No. JP 2013-093868, filed on Apr. 26, 2013. This application claims the benefits and priority of these prior applications and incorporates their disclosures by reference in their entireties.

TECHNICAL FIELD

The present invention relates to a water-based hydrophilizing surface treatment agent, a hydrophilic coating film, and a hydrophilizing surface treatment method. More particularly, the present invention relates to a water-based hydrophilizing surface treatment agent for forming, on the surface of metal materials: such as molded-processed articles such as automotive bodies, automotive parts, building materials, or home electrical appliance parts; cast articles; sheets; or coils, a sustaining hydrophilic coating film which has excellent hydrophilicity, corrosion resistance, heat resistance, adhesiveness, and blocking resistance, and has both water resistance and moisture resistance in a trade-off relationship with hydrophilicity, the hydrophilic coating film, and a hydrophilizing surface treatment method.

BACKGROUND ART

Various types of metal materials such as sheets, coils, molded articles are subjected to surface treatment for providing various types of performance. Examples of the performance include, preventing corrosion, making coatings less likely to be peeled, making coatings more likely to be wet with water, and making coatings more likely to repel water. Above all, aluminum and alloys thereof (hereinafter, referred to as aluminum materials) are generally light and excellent in workability, and thus often used for home electrical appliances and automobiles. Corrosion resistance, hydrophilicity, moisture resistance, and sustainability thereof are required, in particular, for fins and heat exchangers that are used by taking advantage of the characteristically high thermal conductivity of the aluminum materials.

Air-conditioners (including outdoor units) that have functions such as cooling, heating, and dehumidification are provided with fins for heat exchangers, which are formed from the aluminum materials. The fins for heat exchanges are designed so that radiating parts and cooling parts occupy as large surface areas as possible, and intended to improve the radiation effect and the cooling effect. As a result, the fins which serve as radiating parts and cooling parts are often made to have an extremely narrow space therebetween.

The aluminum materials, etc. constituting the fins are often provided with hydrophilicity and corrosion resistance by surface treatment. Methods for the surface treatment include two methods of: a so-called post-coating method of molding or assembling a fin material into an intended shape, and then applying a surface treatment agent by means such as dipping, spraying, or showering; and a so-called pre-coating method of forming, on a plate material, a surface treatment film in advance by means such as a roll coater, and then carrying out molding or the like into a fin material. In the case of the pre-coating method, such a surface treatment coating film is required that will not abrade tools such molds in processing.

In the air-conditioners in operation for cooling, moisture in the air builds up condensation on the surfaces of the fins which serve as cooling parts. The dew condensation water is more likely to become water droplets as the surfaces of the fins are more highly hydrophobic, and the growth of the water droplets causes clogging (bridge) between the fins. When the bridge is caused, problems may be created such as an increase in ventilation resistance, a decrease in heat-exchange efficiency, and dispersal of the clogging water droplets.

In addition, through the intermittent use of the air conditioners, retention of dew condensation water and drying are repeated, and the fin surfaces may be corroded to shorten the product lifetimes. Moreover, in the case of air-conditioners in cars and rooms, corrosion products deposited between fins may fly apart in the cars and the rooms.

Surface treatment coating films provided on the surfaces of the fins may be dissolved or run off by the dew condensation water, and as a result, various types of performance such as hydrophilicity may be lost. In particular, hydrophilic surface treatment coating films that use water-soluble polymers has this tendency remarkably, and the hydrophilicity is likely to have a trade-off relationship with water resistance or durability of hydrophilicity. Thus, the surface treatment coating films are required to have both hydrophilicity and water resistance.

Therefore, in order to solve the problems with dew condensation water, methods of providing corrosion resistance and hydrophilicity are required for the aluminum materials constituting the fins. In particular, methods are required which have excellent hydrophilicity and high corrosion resistance, and retained hydrophilicity and water resistance over a long period of time.

As such surface treatment methods, various methods are proposed such as: a method of spraying a treatment liquid containing silica sol or silicate to forma hydrophilic coating film (Patent Literature 1); a method of forming a chromate-based corrosion-resistant coating film, and then immersing the film in an aqueous solution containing, as its main components, a silicon oxide and a sodium oxide to form a hydrophilic coating film (Patent Literature 2); a method of applying a coating material including a hydrophilic acrylic polymer and an inorganic particulate filler (Patent Literature 3); and a method of applying a coating material composed of a water-soluble or water-dispersible organic resin, an organic corrosion inhibitor, and silica particles (Patent Literature 4).

CITATION LIST

Patent Literature

Patent Literature 1: Japanese Patent Application Publication No. S58-126989 A

Patent Literature 2: Japanese Patent Application Publication No. S59-13078 A

Patent Literature 3: Japanese Patent Application Publication No. S63-372 A

Patent Literature 4: Japanese Patent Application Publication No. H5-214273 A

SUMMARY OF INVENTION

Technical Problem

However, the various types of surface treatment techniques proposed conventionally have failed to form hydrophilic coating films which have adequate hydrophilicity, durability of hydrophilicity, corrosion resistance, water resistance, and moisture resistance, and effective hydrophilizing surface treatment agents have not been developed so far.

The present invention has been achieved to solve the problem mentioned above, and an object of the present invention is to provide a water-based hydrophilizing surface treatment agent for forming, on a surface of a metal material, a sustaining hydrophilic coating film which has excellent hydrophilicity, corrosion resistance, heat resistance, adhesiveness, and blocking resistance, and has both water resistance and moisture resistance in a trade-off relationship with hydrophilicity. Furthermore, another object of the present invention is to provide a hydrophilic coating film obtained by treating with the water-based hydrophilizing surface treatment agent, and a hydrophilizing surface treatment method with the use of the water-based hydrophilizing surface treatment agent.

Solution to Problem (1) A water-based hydrophilizing surface treatment agent according to the present invention for solving the problem mentioned above comprises an organic-inorganic silicon compound (A) and an inorganic particle (B), wherein the organic-inorganic silicon compound (A) is a compound obtained by mixing a colloidal silica (C) and an organoalkoxysilane (D).

In the water-based hydrophilizing surface treatment agent according to the present invention, the ratio $(M_B/M_A)$ between the solid content mass $M_A$ of the organic-inorganic silicon compound (A) and the solid content mass $M_B$ of the inorganic particle (B) can be adapted to fall within the range of 0.2 or more and 2.0 or less.

In the water-based hydrophilizing surface treatment agent according to the present invention, the average particle size of the organic-inorganic silicon compound (A) can be adapted to fall within the range of 3 nm or more and 500 nm or less.

In the water-based hydrophilizing surface treatment agent according to the present invention, the average particle size of the colloidal silica (C) can be adapted to fall within the range of 3 nm or more and 500 nm or less.

In the water-based hydrophilizing surface treatment agent according to the present invention, the average particle size of the inorganic particle (B) can be adapted to fall within the range of 10 nm or more and 600 nm or less.

In the water-based hydrophilizing surface treatment agent according to the present invention, a terminal group(s) of the organoalkoxysilane (D) can be adapted to be one, or two or more functional groups selected from an epoxy group, an amino group, a mercapto group, an acryloxy group, an ureide group, an isocyanate group, and a vinyl group.

In the water-based hydrophilizing surface treatment agent according to the present invention, the inorganic particle (B) can be adapted to be poorly soluble metal phosphate particles.

In the water-based hydrophilizing surface treatment agent according to the present invention, a metal contained in the metal phosphate particles can be adapted to be at least one selected from Zn, Fe, Mn, Al, and Ca.

The water-based hydrophilizing surface treatment agent according to the present invention can be adapted to contain one or more zirconium compounds as a component (E).

In the water-based hydrophilizing surface treatment agent according to the present invention, the component (E) can be adapted to comprise one, or two or more metal salts selected from a nitrate, a sulfate, a carbonate, a hydrofluoric acid salt, an ammonium salt, a potassium salt, and a sodium salt.

The water-based hydrophilizing surface treatment agent according to the present invention can be adapted to contain one or more surfactants as a component (F).

In the water-based hydrophilizing surface treatment agent according to the present invention, the content of the component (F) can be adapted to fall within the range of 1 mass % or more and 50 mass % or less to the total solid content of the agent.

(2) A hydrophilic coating film according to the present invention for solving the problem mentioned above is characterized in that the film is obtained by applying and drying the foregoing water-based hydrophilizing surface treatment agent according to the present invention.

(3) A hydrophilizing surface treatment method according to the present invention for solving the problem mentioned above is characterized in that the water-based hydrophilizing surface treatment agent according to the present invention is applied on a part or whole of a surface of a metal material, and the water-based hydrophilizing surface treatment agent is dried to form a hydrophilic coating film.

Advantageous Effects of Invention

According to the present invention, a sustaining hydrophilic coating film can be formed which has excellent hydrophilicity, corrosion resistance, heat resistance, adhesiveness, and blocking resistance, and has both water resistance and moisture resistance in a trade-off relationship with hydrophilicity. Furthermore, the present invention can achieve resource saving and energy saving, and thus has tremendous industrial value.

Thus, according to the present invention, a hydrophilic coating film which produces the advantageous effects mentioned above can be formed on the surface of metal materials: such as molded-processed articles such as automotive bodies, automotive parts, building materials, or home electrical appliance parts; cast articles; sheets; or coils, and the present invention is thus remarkably advantageous for improving the heat-exchange efficiency of a heat exchanger made of an aluminum material, for example.

DESCRIPTION OF EMBODIMENTS

Embodiments of the present invention will be described below. However, the following description is absolutely the best mode, but the present invention is not to be considered limited to the description. For example, the upper limits and lower limits of numerical ranges are mentioned as preferred ranges, and even beyond the upper limits or the lower limits, it falls within the technical scope of the present invention as long as the component requirements of the present invention are fulfilled.

[Water-Based Hydrophilizing Surface Treatment Agent]

The water-based hydrophilizing surface treatment agent according to the present invention is a treatment agent containing an organic-inorganic silicon compound (A) and an inorganic particle (B). Further, the organic-inorganic silicon compound (A) is a compound obtained by mixing a colloidal silica (C) and an organoalkoxysilane (D). This water-based hydrophilizing surface treatment agent may further contain one or more zirconium compounds as a component (E), and the component (E) may include one, or two or more metal salts selected from nitrates, sulfates, carbonates, hydrofluoric acid salts, ammonium salts, potassium salts, and sodium salts. In addition, the agent may contain one or more surfactants as a component (F).

<Organic-Inorganic Silicon Compound (A)>

The organic-inorganic silicon compound (A) is a component material that is essential to the water-based hydrophilizing surface treatment agent. The organic-inorganic silicon compound (A) is obtained by mixing the colloidal silica (C) and the organoalkoxysilane (D). The obtained organic-inorganic silicon compound (A) is present as a silicon compound dispersion in the water-based hydrophilizing surface treatment agent. The organoalkoxysilane (D) develops hydrolysis reaction and condensation reaction, and the method for the reactions is not particularly limited, but known methods such as heating and agitation can be adopted. Further, the hydrolysis of the organoalkoxysilane (D) with water produces an alcohol (G), and this alcohol (G) can be volatilized during drying after applying the water-based hydrophilizing surface treatment agent.

The average particle size of the organic-inorganic silicon compound (A) is approximately equal to the average particle size of the colloidal silica (C), and preferably falls within the range of, but not particularly limited to, 3 nm or more and 500 nm or less. Within this range, hydrophilic coating films can be obtained which have hydrophilicity, water resistance, moisture resistance, adhesiveness, and durability of hydrophilicity. The performance of the hydrophilic coating film may be unstable when the average particle size is less than 3 nm, whereas film defects are made likely to be generated when the film is formed from coarse particles in excess of 500 nm in average particle size. In addition, the average particle size has a further preferred range of 4 nm or more and 100 nm or less, and a particularly preferred range of 4 nm or more and 30 nm or less. It is to be noted that the average particle size was measured with a particle size distribution measurement system (Model Name: Nanotrac EX150, from NIKKISO CO., LTD.).

The ratio ($M_D/M_C$) between the respective masses $M_C$ and $M_D$ of the colloidal silica (C) and organoalkoxysilane (D) mixed for forming the organic-inorganic silicon compound (A) is not particularly limited, but preferably falls within the range of 0.1 or more and 9.0 or less, more preferably within the range of 0.5 or more and 4.0 or less, and particularly preferably within the range of 1.0 or more and 3.0 or less. As long as the ratio ($M_D/M_C$) by mass falls within the preferred range, the adhesiveness between a hydrophilic coating film and a metal material surface is further improved. In addition, as long as the ratio ($M_D/M_C$) by mass falls within the ratio of 1.0 or more and 2.0 or less, hydrophilicity of the coating film is further improved, and as long as the ratio falls within the range of 1.5 or more and 3.0 or less, moisture resistance of the coating film is further improved. Further, as long as the ratio ($M_D/M_C$) by mass falls within the ratio of 1.0 or more and 4.0 or less, the coating film having excellent hydrophilicity, durability of hydrophilicity, corrosion resistance, and adhesiveness can be achieved.

The organic-inorganic silicon compound (A) itself is not the colloidal silica (C) or the organoalkoxysilane (D), but carbon is measured by total organic carbon (TOC) measurement (for example, such as a carbon analyzer from LECO). This carbon is due to the fact that the organic-inorganic silicon compound (A) has carbon derived from organoalkoxysilane. In addition, a distinction can be also made from the fact that the zeta potential of the colloidal silica has a strongly negative charge, whereas the zeta potential of the organic-inorganic silicon compound (A) typically has a weakly negative to positive charge, depending on the variety of the organoalkoxysilane (D) used.

(Colloidal Silica)

The colloidal silica (C) is a colloid of $SiO_2$ or its hydrate, and intended to form the organic-inorganic silicon compound (A) along with the organoalkoxysilane (D). The colloidal silica (C) is typically obtained by dialyzing the reaction product of dilute hydrochloric acid and silicate, and sol that is hard to precipitate at an ordinary temperature.

The colloidal silica (C) is not to be considered particularly limited, but for example, SNOWTEX C, SNOWTEX CS, SNOWTEX CM, SNOWTEX O, SNOWTEX OS, SNOWTEX OM, SNOWTEX NS, SNOWTEX N, SNOWTEX NM, SNOWTEX S, SNOWTEX 20, SNOWTEX 30, SNOWTEX 40 (which are all trade names from Nissan Chemical Industries, Ltd.), and the like can be used. In addition, SNOWTEX UP, SNOWTEX OUP, SNOWTEX PS-S, SNOWTEX PS-SO, SNOWTEX PS-M, SNOWTEX PS-MO, SNOWTEX PS-L or SNOWTEX PS-LO processed into the form of special chains (which are all trade names from Nissan Chemical Industries, Ltd.), and the like can be also used. In addition, ADELITE AT-20N, ADELITE AT-20A, ADELITE AT-20Q (which are all trade names from ADEKA), and the like can be also used.

The average particle size of the colloidal silica (C), which is approximately equal to the average particle size of the organic-inorganic silicon compound (A), preferably falls within the range of 3 nm or more and 500 nm or less, further preferably falls within the range of 4 nm or more and 100 nm or less from the perspective of improving the respective properties, and particularly preferably falls within the range of 4 nm or more and 60 nm or less from the perspective of further enhancing durability of hydrophilicity. It is to be noted that the average particle size was measured by the same method as the method described above.

(Organoalkoxysilane)

The organoalkoxysilane (D) intended to form the organic-inorganic silicon compound (A) along with the colloidal silica (C), and has alkoxysilane group(s). This alkoxysilane group is, in contact with water, hydrolyzed to form a silanol group (Si—OH), and then cross-linked to form a siloxane compound.

The type of organoalkoxysilane (D) is not to be considered particularly limited, but examples thereof include, for example, tetramethoxysilane, tetraethoxysilane, trimethylmethoxysilane, trimethylethoxysilane, dimethyldimethoxysilane, dimethyldiethoxysilane, methyltrimethoxysilane, methyltriethoxysilane, cyclohexylmethyldimethoxysilane, n-hexyltrimethoxysilane, diphenyldimethoxysilane, diphenyldiethoxysilane, phenyltrimethoxysilane, phenyltriethoxysilane, decyltrimethoxysilane, octadecyltrimethoxysilane, octadecyltriethoxysilane, isobutyltrimethoxysilane, vinyltrichlorosilane, vinyltrimethoxysilane, vinyltriethoxysilane, β-(3,4-epoxycyclohexyl)ethyltrimethoxysilane, γ-glycidoxypropyltrimethoxysilane, γ-glycidoxypropylmethyldiethoxysilane, γ-glycidoxypropyltriethoxysilane, N-β(aminoethyl)γ-aminopropylmethyldimethoxysilane, γ-aminopropyltrimethoxysilane, γ-aminopropyltriethoxysilane, γ-methacryloxypropylmethyldimethoxysilane, γ-methacryloxypropylmethyldiethoxysilane, γ-mercaptopropylmethyldimethoxysilane, p-styryltrimethoxysilane, γ-acryloxypropyltrimethoxysilane, N-phenyl-γ-aminopropyltrimethoxysilane, γ-ureidopropyltriethoxysilane, γ-chloropropyltrimethoxysilane, bis(triethoxysilylpropyl)tetrasulfide, γ-isocyanatepropyltriethoxysilane, γ-triethoxysilyl-N-(1,3-dimethyl-butylidene)propylamine, and N-(vinylbenzylamine)-β-aminoethyl-γ-aminopropyltrimethoxysilane. Above all, trialkoxysilane is preferred which has 3 mol of active alkoxy groups.

Examples of the organoalkoxysilane (D) can include compounds represented by the following general formula (I):

[Chemical Formula 1]

(I)

In the general formula (I), X that is a terminal group of the organoalkoxysilane (D) is preferably a functional group selected from an epoxy group, an amino group, a mercapto group, an acryloxy group, an ureide group, an isocyanate group, and a vinyl group. Above all, an epoxy group or an amino group are preferred. It is to be noted that when n is 2 or more, each X may be identical or different. L represents a divalent linking group or a single bond. Examples of the linking group represented by L include, for example, an alkylene group (preferably having 1 to 20 of carbon atom), —O—, —S—, an arylene group, —CO—, —NH—, —SO$_2$—, —COO—, —CONH—, or a group formed by combining two or more of these groups. Above all, an alkylene group is preferred. In the case of a single bond, it indicates that X of the general formula (I) is directly linked to Si (silicon atom). It is to be noted that when n is 2 or more, each L may be identical or different. R each independently represents an alkyl group (preferably having 1 to 4 of carbon atom), or a hydrogen atom. n represents an integer of 1 to 3. Above all, n is preferably 1.

The organoalkoxysilane (D) has one or more functional groups which are not limited, but preferably have one, or two or more of functional groups selected from amino groups and epoxy groups, and further preferably have one, or two or more of functional groups selected from, for example, an amino group, a glycidoxy group, and an N-aminoethylamino group. The organoalkoxysilane (D) has these functional groups, thereby achieving, when a hydrophilic coating film is formed, a hydrophilic coting film which has a barrier property further improved, and has more remarkable water resistance, moisture resistance, adhesiveness and a blocking resistant property. This is believed to be because the siloxane bonding between the colloidal silica (C) and the organoalkoxysilane (D) is promoted to form a dense hydrophilic coating film. It is to be noted that the organoalkoxysilane(s) (D) may be a hydrolyzed product in which a part of alkoxy groups are hydrolyzed, and/or a condensation product.

(Alcohol)

The alcohol is produced by hydrolysis of the organoalkoxysilane (D), and contained in the water-based hydrophilizing surface treatment agent. It is to be noted that the alcohol can be volatilized in the process of forming a hydrophilic coating film in which comprises applying the water-based hydrophilizing surface treatment agent to the surface of a metal material, and dying the agent. Therefore, the alcohol can be adapted not to be substantially contained in a hydrophilic coating film formed. The type(s) of the alcohol are dependent on the type(s) of the alkoxy group(s) of the organoalkoxysilane (D) used, and examples thereof include, for example, methanol, ethanol, and propanol.

The molar ratio ($C_A/C_D$) between the molar concentration (mol/L) ($C_A$) of the alcohol contained in the water-based hydrophilizing surface treatment agent and molar concentration (mol/L) ($C_D$) of the alcohol in the water-based hydrophilizing surface treatment agent obtained when the alkoxy groups included in the organoalkoxysilane (D) are all hydrolyzed is adjusted to fall within the range of 0.05 or more and 0.9 or less.

When the molar ratio ($C_A/C_D$) is less than 0.05, the reactive functional groups required for forming siloxane bonding between the colloidal silica (C) and the organoalkoxysilane (D) may be eliminated from the organoalkoxysilane (D). Therefore, hydrophilic coating films formed by the water-based hydrophilizing surface treatment agent including the organic-inorganic silicon compound (A) may be discontinuous, and, as a result, inferior in water resistance. When the molar ratio ($C_A/C_D$) is greater than 0.9, the reactive functional groups required for forming siloxane bonding between the colloidal silica (C) and the organoalkoxysilane (D) are increased, thus causing that the siloxane bond is formed between the organoalkoxysilanes (D). As a result, the hydrophilic coating film made not to be dense, it tends to be difficult to form a hydrophilic coating film which have dense bonds between the colloidal silica (C) and the organoalkoxysilane (D), and the obtained hydrophilic coating film may be inferior in adhesiveness.

The method for adjusting the molar concentration (mol/L) of the alcohol derived from the alkoxy group(s) of the organoalkoxysilane (D) is not particularly limited, but examples thereof include, for example, a method of adjusting the concentration by controlling the amount of alcohol produced as a by-product in a solution of the organoalkoxysilane (D) mixed with a silanol condensation catalyst and water, and a method of adjusting the concentration by removing the alcohol produced as a by-product and water. Further, the method for measuring the alcohol concentration is not particularly limited, but examples thereof include a gas chromatography method and nuclear magnetic resonance spectrometry.

<Inorganic Particle (B)>

The inorganic particle (B) is a component material that is essential to the water-based hydrophilizing surface treatment agent. The inorganic particle (B) is preferably poorly soluble metal phosphate particle. The metal phosphate is preferably a salt of one, or two or more of metal selected from Zn, Fe, Mn, Al, and Ca. It is to be noted that the term "poorly soluble" means that the particles are not dissolved in the water-based hydrophilizing surface treatment agent.

Above all, from the perspective of hydrophilicity, the inorganic particle (B) is preferably poorly soluble zinc phosphate particle and/or poorly soluble iron phosphate particle, and more preferably zinc phosphate particle. It is to be noted that the "zinc phosphate" may be a salt containing at least a phosphate (PO$_4$) and zinc, which may contain other metals, etc., or have the form of a hydrate. Preferably, the inorganic particle (B) is Zn$_3$(PO$_4$)$_2$.4H$_2$O (for example, hopeite) can be provided from which the anion is only phosphate, whereas the cation is only zinc.

The average particle size of the inorganic particle (B) falls within the range of 10 nm or more and 600 nm or less. Within this range, hydrophilicity and durability of hydrophilicity are further improved. Within this range, it is believed that the average particle size is made equal to or less than the thickness of a hydrophilic coating film formed, thereby the inorganic particle (B) is not protruded from the hydrophilic coating film. The further preferred range is 50 nm or more and 500 nm or less. Further, the average particle size was measured by the same method as the method described above.

The ratio ($M_B/M_A$) between the solid content mass $M_B$ of the inorganic particles (B) contained in the water-based hydrophilizing surface treatment agent and the solid content mass $M_A$ of the organic-inorganic silicon compound (A) therein preferably falls within the range of 0.2 or more and 2.0 or less. Within this range, without interfering with the continuity of the hydrophilic coating film, the hydrophilicity of the inorganic particle (B) can be exhibited adequately, and the water resistance and adhesiveness of the hydrophilic coating film are improved. Furthermore, the composite of the organic-inorganic silicon compound (A) and the inorganic particle (B) can form a hydrophilic coating film which has both appropriate hardness and flexibility, and excellent adhesiveness.

Hydrophilicity and durability of hydrophilicity cannot be obtained adequately when the ratio ($M_B/M_A$) by mass is less than 0.2, whereas the ratio ($M_B/M_A$) by mass greater than 2.0 may result in failure to achieve adhesiveness to a metal material. It is to be noted that in order to further improve the respective properties such as hydrophilicity, the ratio ($M_B/M_A$) by mass preferably falls within the range of 0.4 or more and 1.2 or less, and particularly preferably within the range of 0.6 or more and 1.0 or less.

<Component (E)>

The water-based hydrophilizing surface treatment agent further preferably contains one or more zirconium compounds as a component (E), and the component (E) includes further preferably one, or two or more metal salts selected from nitrates, sulfates, carbonates, hydrofluoric acid salts, ammonium salts, potassium salts, and sodium salts. Above all, from the perspective of water resistance and moisture resistance, the component (E) includes particularly preferably zirconium compounds of one, or two or more metal salts selected from carbonates, sulfates, ammonium salts, and potassium salts, and more preferably a zirconium compound containing a carbonate and/or a zirconium compound containing ammonium. It is to be noted that component (E) is a component that is optionally contained in the water-based hydrophilizing surface treatment agent.

Specific examples of the component (E) can include, but not limited to, ammonium zirconium fluoride, ammonium zirconium carbonate, and potassium zirconium carbonate, for example, as shown by examples to be described. These zirconium compounds are contained as complex salts in the water-based hydrophilizing surface treatment agent, and the water-based hydrophilizing surface treatment agent containing such a complex salt can form hydrophilic coating film having a highly water-resistant.

When a zirconium compound such as, for example, ammonium zirconium carbonate and potassium zirconium carbonate is used as a complex salt of zirconium carbonate, the hydrophilic coating film formed by the water-based hydrophilizing surface treatment agent containing the zirconium compound has zirconium compounds derived from the complex salt of zirconium carbonate. Specifically, the hydrophilic coating film formed turns into a composite coating film containing a zirconium oxide, a zirconium hydroxide, a zirconium carbonate, and the like, through entire or partial volatilization of the carbonate and ammonium in the complex salt of zirconium carbonate by drying.

When the water-based hydrophilizing surface treatment agent contains therein the component (E), the content thereof is not particularly limited, but preferably falls within the range of 0.1 mass % or more and 50 mass % or less, more preferably within the range of 0.1 mass % or more and 40 mass % or less, and particularly preferably within the range of 3 mass % or more and 30 mass % or less, with respect to the total solid content in the treatment agent. As long as the component (E) falls within the range mentioned above, the hydrophilic coating film formed by the water-based hydrophilizing surface treatment agent has water resistance and corrosion resistance further increased, and the composite with organic-inorganic silicon compound (A) can form a hydrophilic coating film which has both appropriate hardness and flexibility, and excellent adhesiveness. In this regard, the content of the component (E) in the water-based hydrophilizing surface treatment agent refers to the mass in terms of the metal component constituting the component (E).

<Component (F)>

The water-based hydrophilizing surface treatment agent may contain therein one or more surfactants as a component (F). The type of the surfactant is preferably a type of surfactant which will not block advantageous effects of the present invention. The content of the component(s) (F), from the perspective of workability, storage behavior and design achieved by the present invention being improved, and of the qualities (hydrophilicity and corrosion resistance, etc.) achieved by the present invention being not impaired, preferably falls within the range of 1 mass % or more and 50 mass % or less, and mode preferably within the range of 1 mass % or more and 20 mass % or less with respect to the total solid content in the water-based hydrophilizing surface treatment agent.

<Others>

The water-based hydrophilizing surface treatment agent may contain antifoamer(s), leveling agent(s), antibacterial and anti-mold agent(s), colorant(s), etc., if necessary. However, these agents should be added to the extent that the qualities of the hydrophilic coating film obtained from the water-based hydrophilizing surface treatment agent would not be impaired, and preferably account for several mass % in the water-based hydrophilizing surface treatment agent at the most.

[Hydrophilizing Surface Treatment Method]

The hydrophilizing surface treatment method according to the present invention is a method in which the water-based hydrophilizing surface treatment agent is applied partially or entirely to the surface of a metal material, and dried the agent to form a hydrophilic coating film.

The metal material used is not particularly limited, but example thereof include hot-dip galvanized steel plates (GI), alloyed hot-dip galvanized steel plates (GA) obtained by alloying the hot-dip galvanized steel plates, molten zinc alloy coated steel plates (GL) containing 55% aluminum, electrogalvanized steel plates (EG), electrolytic zinc-Ni alloy coated steel plates (Zn—Ni), aluminum coated steel plates, aluminum plates, and aluminum alloy plates. Above all, the aluminum materials are preferred such as aluminum plates and aluminum alloy plates.

The water-based hydrophilizing surface treatment agent is prepared by sufficiently mixing, with the use of agitation equipment such as a mixer, a dispersion of the organic-inorganic silicon compound (A) and a dispersion of the inorganic particle (B), and if necessary, a solution or a dispersion of the component (E), the component (F), an antifoamer, a leveling agent, an antibacterial and anti-mold agent, a colorant, etc. in a water solvent.

Before applying the water-based hydrophilizing surface treatment agent to the metal material, pretreatment may be applied, if necessary, for the purpose of removing oil and contamination on the surface of the metal material. The metal material may be coated with a rust-proof oil for the purpose of corrosion prevention, and may have oil such as working oil and contamination attached to the metal material during work. Applying the pretreatment cleans the surface of the metal material, and can easily be applied uniformly the water-based hydrophilizing surface treatment agent to the surface. It is to be noted that there is no particular need to carry out pretreatment, when the water-based hydrophilizing surface treatment agent can be uniformly applied without any oil or contamination on the surface of the metal material. The pretreatment method is not particularly limited, but examples thereof include methods such as hot-water washing, solvent cleaning, alkali degreasing, and acid washing.

In addition, for the purpose of improving corrosion resistance, the metal material may be subjected to various types of corrosion-resistant pretreatment. The method for the corrosion-resistant pretreatment is not particularly limited, but examples thereof include chemical conversion treatment with chromic chromate, phosphoric chromate, zinc phosphate, zirconium phosphate, and the like, and corrosion-resistant pretreatment of chromium-containing or chromium-free coating type.

The water-based hydrophilizing surface treatment agent is applied to the metal material thus prepared. As the application method, an optimum method is selected appropriately depending on the shape, etc. of the metal material to be treated, and examples of the method include, for example, a roll coating method, a dipping method, and a spray coating method. More specifically, for example, as long as the metal material has the form of a sheet, it is preferable to apply the agent while adjusting the amount of application by a roll coating method or a spray coating method. In addition, as long as the metal material is a molded article, there are methods such as dipping in the water-based hydrophilizing surface treatment agent, followed by pulling up, and in some cases, blowing off the excess treatment agent with a compressed gas to adjust the amount of application.

As for the amount of application, the agent is preferably applied so that the amount of coating film after drying by heating falls within the range of 100 mg/m$^2$ or more and 1500 mg/m$^2$ or less, and more preferably within the range of 200 mg/m$^2$ or more and 800 mg/m$^2$ or less.

The heating temperature preferably falls within the range of 40° C. or higher and 300° C. or lower, more preferably within the range of 60° C. or higher and 250° C. or lower, and particularly preferably within the range of 80° C. or higher and 200° C. or lower, as peak metal temperature. When the heating temperature is less than 40° C., water as a main solvent of the water-based hydrophilizing surface treatment agent may remain, thereby making it impossible to fix the hydrophilic coating film on the metal material surface, and decreasing the water resistance and durability of hydrophilicity. When the heating temperature is greater than 300° C., the hydrophilic coating film may be made more likely to be cracked, thereby decreasing the moisture resistance and adhesiveness.

The heating method is not particularly limited, but the applied coating film may be dried by heating with hot air, an induction heater, infrared rays, near-infrared rays, or the like. In addition, for the heating time, an optimum condition is selected appropriately depending on the types, etc. of the compounds in the water-based hydrophilizing surface treatment agent. Above all, in terms of productivity and coating film formability, the heating time is preferably 1 second and longer or 1800 seconds or shorter, and more preferably 10 seconds or longer and 1200 seconds or shorter.

[Hydrophilic Coating Film]

The hydrophilic coating film according to the present invention is obtained by applying and drying the foregoing water-based hydrophilizing surface treatment agent according to the present invention. The film can be obtained, for example, in away that the water-based hydrophilizing surface treatment agent is applied to the surface of the metal material and dried, by the foregoing hydrophilizing surface treatment method.

The ratio by mass between the organic-inorganic silicon compound (A) and the inorganic particle (B) contained in the hydrophilic coating film is approximately equal to the ratio ($M_B/M_A$=preferably within the range of 0.2 or more and 2.0 or less) between the solid content mass $M_A$ of the organic-inorganic silicon compound (A) contained in the foregoing water-based hydrophilizing surface treatment agent and the solid content mass $M_B$ of the inorganic particle (B) therein. When the ratio by mass between the organic-inorganic silicon compound (A) and inorganic particles (B) contained in the hydrophilic coating film falls within this range, without interfering with the continuity of the hydrophilic coating film, the hydrophilicity of the inorganic particle (B) can be exhibited adequately, and the water resistance and adhesiveness of the hydrophilic coating film are improved. Furthermore, the composite of the organic-inorganic silicon compound (A) and the inorganic particles (B) can form a hydrophilic coating film which has both appropriate hardness and flexibility, and excellent adhesiveness.

In addition, the content of the component (E) such as one or more zirconium compounds, contained in the hydrophilic coating film, is also approximately equal to the content (preferably within the range of 0.1 mass % or more and 50 mass % or less) of the component (E) contained in the foregoing water-based hydrophilizing surface treatment agent. When the content of the component (E) contained in the hydrophilic coating film falls within this range, the water resistance and moisture resistance of the hydrophilic coating film are increased, and the composite with the previously described organic-inorganic silicon compound (A) can form a hydrophilic coating film which has both appropriate hardness and flexibility, and excellent adhesiveness. In this regard, the content of the component (E) contained in the hydrophilic coating film refers to the mass in terms of the metal component constituting the component (E).

As above described, the water-based hydrophilizing surface treatment agent, hydrophilic coating film, and hydrophilizing surface treatment method according to the present invention can form a sustaining hydrophilic coating film which has excellent hydrophilicity, corrosion resistance, heat resistance, adhesiveness, and blocking resistance, and has both water resistance and moisture resistance in a trade-off relationship with hydrophilicity. Furthermore, the present invention can achieve resource saving and energy saving, and thus has tremendous industrial value.

Thus, according to the present invention, a hydrophilic coating film which produces the advantageous effects mentioned above can be formed on the surface of metal materials: such as molded-processed articles such as automotive bodies, automotive parts, building materials, or home electrical appliance parts; cast articles; sheets or coils, and the present invention is thus remarkably advantageous for improving the heat-exchange efficiency of a heat exchanger made of an aluminum material, for example.

EXAMPLES

Next, advantageous effects of the present invention will be described with reference to examples and comparative examples, but the present examples are not to be considered to limit the present invention, by way of example only for describing the present invention.

[Method for Preparation of Test Piece]
(Metal Material)

The following commercially available aluminum materials were used as the metal material. The dimensions of the test pieces are 300 mm vertical×150 mm horizontal×0.1 mm thick.

A1: JIS-H-4000 A-1050 (Pretreatment: No);
A2: JIS-H-4000 A-1050 (Pretreatment: phosphoric chromate, Cr Coating Weight: 5 mg/m$^2$);
A3: JIS-H-4000 A-1050 (Pretreatment: phosphoric chromate, Cr Coating Weight: 15 mg/m$^2$);
A4: JIS-H-4000 A-1050 (Pretreatment: phosphoric chromate, Cr Coating Weight: 20 mg/m$^2$);
A5: JIS-H-4000 A-1050 (Pretreatment: phosphoric chromate, Cr Coating Weight: 40 mg/m$^2$).

(Pretreatment: Cleaning)

As a method for preparing the test pieces, first, the aluminum materials were immersed for 60 seconds in a 30 g/L aqueous solution of a non-etching weak alkali degreasing agent (Trade Name: FINECLEANER 315E, from NIHON PARKERIZING CO., LTD.) kept at 40° C. to remove oil and contamination on the surfaces of the aluminum materials. Next, after confirming that the surface of the metal material was 100% wet with water by washing with tap water, pure water was further flushed, and the water was removed in an atmosphere at 100° C. These were used as test pieces.

(Pretreatment: Phosphoric Chromate)

As a method for preparing the test pieces A2 to A5 mentioned above, first, the surface of the metal material was cleaned in the same way as described above, and then subjected, so as to provide the predetermined Cr coating weight, to spray treatment for 2 to 10 seconds with a 4.7 g/L aqueous solution of a phosphoric chromate surface treatment agent (Trade Name: ALCHROME-K702, from NIHON PARKERIZING CO., LTD.) kept at 50° C., thereby forming phosphoric chromate coating films. Next, the films were washed with tap water, further flushed with water, and dried for 3 minutes in an atmosphere at 80° C. These were used as test pieces.

[Surface Treatment Agent]
(Component A)

The organic-inorganic silicon compound (component A) constituting the water-based hydrophilizing surface treatment agent is obtained by mixing the following colloidal silica (C) and the following organoalkoxysilane (D), and causing to proceed a hydrolysis reaction and a condensation reaction of the organoalkoxysilane (D).

(Colloidal Silica)
C1: SNOTEX XS (Average Particle Size: 4 to 6 nm)
C2: SNOTEX OS (Average Particle Size: 8 to 11 nm)
C3: SNOTEX 50 (Average Particle Size: 20 to 30 nm)
C4: SNOTEX XL (Average Particle Size: 40 to 60 nm)
C5: SNOTEX ZL (Average Particle Size: 70 to 100 nm)
C6: SNOTEX MP-2040 (Average Particle Size: 200 nm)
C7: SNOTEX MP-4540M (Average Particle Size: 450 nm)
(Organoalkoxysilane)
D1: Vinyltriethoxysilane
D2: Tetraethoxysilane
D3: Aminopropyltriethoxysilane
D4: γ-glycidoxypropyltriethoxysilane
(Component B)

As the inorganic particle (component B), $Zn_3(PO_4)_2 \cdot 4H_2O$ was subjected to grinding with a ball mill with the use of zirconia beads, to use zinc phosphate particles with the following average particle sizes. The zinc phosphate particles were added to water to provide suspensions, the suspensions were then filtrated with 5 μm paper filters, and the average particle sizes of the zinc phosphate particles were measured with a particle size distribution measurement system (Model Name: Nanotrac EX150, from NIKKISO CO., LTD.).

B1: Zinc Phosphate Particles (Average Particle Size: 10 nm)
B2: Zinc Phosphate Particles (Average Particle Size: 50 nm)
B3: Zinc Phosphate Particles (Average Particle Size: 100 nm)
B4: Zinc Phosphate Particles (Average Particle Size: 300 nm)
B5: Zinc Phosphate Particles (Average Particle Size: 500 nm)
B6: Zinc Phosphate Particles (Average Particle Size: 600 nm)

(Component E)
E1: Ammonium Hexafluorozirconate (Trade Name: MORITA CHEMICAL INDUSTRIES CO., LTD.)
E2: Ammonium Zirconium Carbonate (Trade Name: Zircosol AC-7, from Daiichi Kigenso Kagaku Kogyo Co., Ltd.)
E3: Potassium Zirconium Carbonate (Trade Name: Zircosol ZK-10, from Daiichi Kigenso Kagaku Kogyo Co., Ltd.)

(Component F)
F1: PELEX SS-H (Trade Name, from Kao Corporation)
F2: MEGAFAC F-444 (Trade Name, from DIC Corporation)
F3: SURFINOL 440 (Trade Name, from Shin-Etsu Chemical Co., Ltd.)

(Preparation of Surface Treatment Agent)

The treatment agents for examples 1 to 49 and for comparative examples 1 to 4 were prepared by mixing each component mentioned above so as to provide the compositions shown in Tables 1 to 4.

[Surface Treatment Method]

The prepared treatment agents for examples 1 to 49 and treatment agents for comparative examples 1 to 4 were used to form surface treatment coating films according to Examples 1 to 67 and Comparative Examples 1 to 4 by treatment under the conditions shown in Tables 5 to 9 on the metal material subjected to the pretreatment. In the surface treatment method, each surface treatment agent was applied by a bar coating method onto each test piece, and then, without washing with water, directly put in an oven for drying to form the coating film with a predetermined coating weight. The coating by the bar coating method was carried out by using bar coaters of rod Nos. 3 to 5, after the surface treatment agents was dropped onto the test pieces. It is to be noted that the rod Nos. refer to number indicated the diameters of windings in terms of mil, as specified in the previous standards JIS K 5400 "7.5 Coating with Bar Coater". Depending on the type of the bar coater used and the concentration of the surface treatment agent, adjustments were made so as to provide a predetermined coating weight. The drying temperature was adjusted by the temperature of the atmosphere in the oven and the period of time in the oven. The drying temperature in this case indicates peak metal temperature at the surface of the test piece.

It is to be noted that in Comparative Example 5, the material JIS-H-4000 A-1050 was subjected to pretreatment by the cleaning means mentioned above, then subjected to zinc phosphate treatment with the use of PALBOND-AX35 (Trade Name) from NIHON PARKERIZING CO., LTD. so as to provide a predetermined coating weight, and used as a test piece. Further, in Comparative Example 6, the material JIS-H-4000 A-1050 subjected to pretreatment by the same cleaning means was subjected to manganese phosphate treatment so as to provide a predetermined coating weight, in a way that the material was immersed in a chemical conversion treatment liquid of PALPHOS-M1A (Trade Name) from NIHON PARKERIZING CO., LTD., prepared to a predetermined concentration, with 55% hydrofluoric acid added to the liquid at 200 mg/L, and used as a test piece.

TABLE 1

|  | Component (A) | | | Component(B) | | Component(E) | | Component(F) | |
| --- | --- | --- | --- | --- | --- | --- | --- | --- | --- |
|  | Component(C) | Component(D) | $M_D/M_C$ | Type | $M_B/M_A$ | Type | mass % | Type | mass % |
| Treatment Agent for Example 1 | C2 | D3 | 0.1 | B4 | 0.8 | E2 | 10 | F3 | 5 |
| Treatment Agent for Example 2 | C2 | D3 | 0.5 | B4 | 0.8 | E2 | 10 | F3 | 5 |
| Treatment Agent for Example 3 | C2 | D3 | 1.0 | B4 | 0.8 | E2 | 10 | F3 | 5 |
| Treatment Agent for Example 4 | C2 | D3 | 1.5 | B4 | 0.8 | E2 | 10 | F3 | 5 |
| Treatment Agent for Example 5 | C2 | D3 | 1.8 | B4 | 0.8 | E2 | 10 | F3 | 5 |
| Treatment Agent for Example 6 | C2 | D3 | 2.0 | B4 | 0.8 | E2 | 10 | F3 | 5 |
| Treatment Agent for Example 7 | C2 | D3 | 2.5 | B4 | 0.8 | E2 | 10 | F3 | 5 |
| Treatment Agent for Example 8 | C2 | D3 | 3.0 | B4 | 0.8 | E2 | 10 | F3 | 5 |
| Treatment Agent for Example 9 | C2 | D3 | 4.0 | B4 | 0.8 | E2 | 10 | F3 | 5 |
| Treatment Agent for Example 10 | C2 | D3 | 9.0 | B4 | 0.8 | E2 | 10 | F3 | 5 |
| Treatment Agent for Example 11 | C1 | D3 | 1.8 | B4 | 0.8 | E2 | 10 | F3 | 5 |
| Treatment Agent for Example 12 | C3 | D3 | 1.8 | B4 | 0.8 | E2 | 10 | F3 | 5 |
| Treatment Agent for Example 13 | C4 | D3 | 1.8 | B4 | 0.8 | E2 | 10 | F3 | 5 |
| Treatment Agent for Example 14 | C5 | D3 | 1.8 | B4 | 0.8 | E2 | 10 | F3 | 5 |
| Treatment Agent for Example 15 | C6 | D3 | 1.8 | B4 | 0.8 | E2 | 10 | F3 | 5 |
| Treatment Agent for Example 16 | C7 | D3 | 1.8 | B4 | 0.8 | E2 | 10 | F3 | 5 |

TABLE 2

|  | Componet (A) | | | Componet(B) | | Componet (E) | | Componet (F) | |
| --- | --- | --- | --- | --- | --- | --- | --- | --- | --- |
|  | Component(C) | Component(D) | $M_D/M_C$ | Type | $M_B/M_A$ | Type | mass % | Type | mass % |
| Treatment Agent for Example 17 | C1 | D1 | 1.8 | B4 | 0.8 | E2 | 10 | F3 | 5 |
| Treatment Agent for Example 18 | C1 | D2 | 1.8 | B4 | 0.8 | E2 | 10 | F3 | 5 |
| Treatment Agent for Example 19 | C1 | D4 | 1.8 | B4 | 0.8 | E2 | 10 | F3 | 5 |
| Treatment Agent for Example 20 | C1 | D1 | 1.8 | B1 | 0.8 | E2 | 10 | F3 | 5 |
| Treatment Agent for Example 21 | C1 | D1 | 1.8 | B2 | 0.8 | E2 | 10 | F3 | 5 |
| Treatment Agent for Example 22 | C1 | D1 | 1.8 | B3 | 0.8 | E2 | 10 | F3 | 5 |
| Treatment Agent for Example 23 | C1 | D1 | 1.8 | B5 | 0.8 | E2 | 10 | F3 | 5 |
| Treatment Agent for Example 24 | C1 | D1 | 1.8 | B6 | 0.8 | E2 | 10 | F3 | 5 |
| Treatment Agent for Example 25 | C1 | D1 | 1.8 | B5 | 0.2 | E2 | 10 | F3 | 5 |
| Treatment Agent for Example 26 | C1 | D1 | 1.8 | B5 | 0.4 | E2 | 10 | F3 | 5 |
| Treatment Agent for Example 27 | C1 | D1 | 1.8 | B5 | 0.6 | E2 | 10 | F3 | 5 |
| Treatment Agent for Example 28 | C1 | D1 | 1.8 | B5 | 1.0 | E2 | 10 | F3 | 5 |
| Treatment Agent for Example 29 | C1 | D1 | 1.8 | B5 | 1.2 | E2 | 10 | F3 | 5 |
| Treatment Agent for Example 30 | C1 | D1 | 1.8 | B5 | 1.4 | E2 | 10 | F3 | 5 |
| Treatment Agent for Example 31 | C1 | D1 | 1.8 | B5 | 2.0 | E2 | 10 | F1 | 5 |

TABLE 3

|  | Component(A) | | | Component(B) | | Component(E) | | Component(F) | |
| --- | --- | --- | --- | --- | --- | --- | --- | --- | --- |
|  | Component(C) | Component(D) | $M_D/M_C$ | Type | $M_B/M_A$ | Type | mass % | Type | mass % |
| Treatment Agent for Example 32 | C2 | D3 | 1.8 | B4 | 0.8 | E1 | 10 | F2 | 5 |
| Treatment Agent for Example 33 | C2 | D3 | 1.8 | B4 | 0.8 | E3 | 10 | F1 | 5 |
| Treatment Agent for Example 34 | C1 | D1 | 1.8 | B5 | 0.8 | — | 0 | F1 | 5 |
| Treatment Agent for Example 35 | C1 | D1 | 1.8 | B5 | 0.8 | E2 | 0.1 | F1 | 5 |
| Treatment Agent for Example 36 | C1 | D1 | 1.8 | B5 | 0.8 | E2 | 3 | F1 | 5 |
| Treatment Agent for Example 37 | C1 | D1 | 1.8 | B5 | 0.8 | E2 | 20 | F1 | 5 |
| Treatment Agent for Example 38 | C1 | D1 | 1.8 | B5 | 0.8 | E2 | 30 | F3 | 5 |
| Treatment Agent for Example 39 | C1 | D1 | 1.8 | B5 | 0.8 | E2 | 40 | F3 | 5 |
| Treatment Agent for Example 40 | C1 | D1 | 1.8 | B5 | 0.8 | E2 | 50 | F3 | 5 |
| Treatment Agent for Example 41 | C1 | D1 | 1.8 | B4 | 0.8 | E2 | 10 | F1 | 5 |
| Treatment Agent for Example 42 | C1 | D3 | 1.8 | B4 | 0.8 | E2 | 10 | F2 | 5 |
| Treatment Agent for Example 43 | C1 | D3 | 1.8 | B4 | 0.8 | E2 | 10 | F1 | 0 |
| Treatment Agent for Example 44 | C1 | D3 | 1.8 | B4 | 0.8 | E2 | 10 | F1 | 1 |
| Treatment Agent for Example 45 | C1 | D3 | 1.8 | B4 | 0.8 | E2 | 10 | F1 | 10 |
| Treatment Agent for Example 46 | C1 | D3 | 1.8 | B4 | 0.8 | E2 | 10 | F1 | 20 |
| Treatment Agent for Example 47 | C1 | D3 | 1.8 | B4 | 0.8 | E2 | 10 | F1 | 30 |
| Treatment Agent for Example 48 | C1 | D3 | 1.8 | B4 | 0.8 | E2 | 10 | F1 | 40 |
| Treatment Agent for Example 49 | C1 | D3 | 1.8 | B4 | 0.8 | E2 | 10 | F1 | 50 |

TABLE 4

| | Component(A) | | | Component(B) | | Constituent(E) | | Component(F) | |
|---|---|---|---|---|---|---|---|---|---|
| | Component(C) | Component(D) | $M_D/M_C$ | Type | $M_B/M_A$ | Type | mass % | Type | mass % |
| Treatment Agent for Comparative Example 1 | C2 | — | 0 | B4 | 0.8 | E2 | 10 | F3 | 5 |
| Treatment Agent for Comparative Example 2 | — | D3 | — | B4 | 0.8 | E2 | 10 | F3 | 5 |
| Treatment Agent for Comparative Example 3 | C1 | D1 | 1.8 | — | 0 | E2 | 10 | F3 | 5 |
| Treatment Agent for Comparative Example 4 | — | — | — | B4 | — | E2 | 10 | F3 | 5 |

[Performance Evaluation]

The following performance evaluations were made on the surface treatment coating films obtained by treating under the conditions according to Examples 1 to 67 and Comparative Examples 1 to 6. The results are shown along with the surface treatment conditions in Tables 5 to 9. In the following, ⊚ (Rank 1), ○ (Rank 2), and Δ (Rank 3) were evaluated to fall within the available range, whereas x (Rank 4) was evaluated to fail.

(Hydrophilicity)

The hydrophilicity was evaluated from contact angles measured by a liquid drop method with the use of a contact angle meter (Model Name: DIGIDROP D-S, from GBX in France). For the contact angles, with a water droplet amount of 2 μL, contact angles were measured at 30 seconds after delivering by drops. The evaluation criteria are shown below.

⊚ (Rank 1): Contact Angle of 5° or less
○ (Rank 2): Contact Angle of more than 5° and 25° or less
Δ (Rank 3): Contact Angle of more than 25° and 40° or less
x (Rank 4): Contact Angle of more than 40°

(Durability of Hydrophilicity)

The durability of hydrophilicity was evaluated from contact angles after immersion in running water for 360 hours. It is to be noted that in the immersion in running water, a material to be tested was immersed in running water (Rate of Running Water: 0.5 L/min, deionized water) at room temperature, and dried for 10 minutes at 80° C. The measurement of the contact angle conforms to the same method as for the above-described evaluation of hydrophilicity. The evaluation criteria are shown below.

⊚ (Rank 1): Contact Angle of 5° or less
○ (Rank 2): Contact Angle of more than 5° and 25° or less
Δ (Rank 3): Contact Angle of more than 25° and 40° or less
x (Rank 4): Contact Angle of more than 40°

(Corrosion Resistance A)

The corrosion resistance A was evaluated by a salt spray test. The salt spray test was carried out on the basis of JIS-Z-2371, the test pieces were retained for 960 hours after the salt spray test, then lightly rinsing with pure water, and drying. The corroded condition was observed visually, and the corrosion resistance was evaluated with the area ratio of white rust generated at a planar part (the ratio of an area with white rust generated to the total area of the test piece). The evaluation criteria are shown below.

⊚ (Rank 1): Corrosion of 5% or less
○ (Rank 2): Corrosion of more than 5% and 20% or less
Δ (Rank 3): Corrosion of more than 20% and 50% or less
x (Rank 4): Corrosion of more than 50%

(Corrosion Resistance B)

The corrosion resistance B was evaluated by a humidity cabinet test. In the humidity cabinet test, after the test pieces were retained for 960 hours in an atmosphere at 95% relative humidity and a temperature of 50° C., and dried. The corroded condition was observed visually, and the corrosion resistance was evaluated with the area ratio of white rust generated at a planar part (the ratio of an area with white rust generated to the total area of the test piece). The evaluation criteria are shown below.

⊚ (Rank 1): Corrosion of 5% or less
○ (Rank 2): Corrosion of more than 5% and 20% or less
Δ (Rank 3): Corrosion of more than 20% and 50% or less
x (Rank 4): Corrosion of more than 50%

(Adhesiveness)

The adhesiveness was evaluated with the degree (area proportion) of peeling the coating film, after a tape peeling test was carried out in accordance with JIS-K-5600. The evaluation criteria are shown below. It is to be noted that the area proportion were evaluated visually and expressed in percentage.

⊚ (Rank 1): Peeling of 5% or less
○ (Rank 2): Peeling of more than 5% and 20% or less
Δ (Rank 3): Peeling of more than 20% and 50% or less
x (Rank 4): Peeling of more than 50%

TABLE 5

| | Conditions | | | | Evaluation Results | | | | |
|---|---|---|---|---|---|---|---|---|---|
| | Metal Material | Treatment Agent No. | Coating Weight mg/m² | Temperature ° C. | Hydrophilicity | Durability of Hydrophilicity | Corrosion Resistance A | Corrosion Resistance B | Adhesiveness |
| Example 1 | A4 | Treatment Agent for Example 1 | 500 | 170 | Δ | Δ | Δ | Δ | Δ |
| Example 2 | A4 | Treatment Agent for Example 2 | 500 | 170 | ○ | Δ | Δ | ○ | ○ |
| Example 3 | A4 | Treatment Agent for Example 3 | 500 | 170 | ⊚ | ○ | ○ | ○ | ⊚ |
| Example 4 | A4 | Treatment Agent for Example 4 | 500 | 170 | ⊚ | ⊚ | ○ | ⊚ | ⊚ |
| Example 5 | A4 | Treatment Agent for Example 5 | 500 | 170 | ⊚ | ⊚ | ⊚ | ⊚ | ⊚ |
| Example 6 | A4 | Treatment Agent for Example 6 | 500 | 170 | ⊚ | ○ | ⊚ | ⊚ | ⊚ |
| Example 7 | A4 | Treatment Agent for Example 7 | 500 | 170 | ○ | ○ | ○ | ⊚ | ⊚ |
| Example 8 | A4 | Treatment Agent for Example 8 | 500 | 170 | ○ | ○ | ○ | ⊚ | ⊚ |
| Example 9 | A4 | Treatment Agent for Example 9 | 500 | 170 | ○ | ○ | ○ | ○ | ○ |
| Example 10 | A4 | Treatment Agent for Example 10 | 500 | 170 | Δ | Δ | Δ | Δ | Δ |
| Example 11 | A4 | Treatment Agent for Example 11 | 500 | 170 | ⊚ | ⊚ | ⊚ | ⊚ | ⊚ |
| Example 12 | A4 | Treatment Agent for Example 12 | 500 | 170 | ⊚ | ⊚ | ⊚ | ○ | ○ |
| Example 13 | A4 | Treatment Agent for Example 13 | 500 | 170 | ⊚ | ⊚ | ○ | ○ | ○ |
| Example 14 | A4 | Treatment Agent for Example 14 | 500 | 170 | ⊚ | ○ | ○ | ○ | ○ |

TABLE 5-continued

| | | | Conditions | | | Evaluation Results | | | |
|---|---|---|---|---|---|---|---|---|---|
| | Metal Material | Treatment Agent No. | Coating Weight mg/m² | Temperature °C. | Hydrophilicity | Durability of Hydrophilicity | Corrosion Resistance A | Corrosion Resistance B | Adhesiveness |
| Example 15 | A4 | Treatment Agent for Example 15 | 500 | 170 | ○ | Δ | ○ | ○ | Δ |
| Example 16 | A4 | Treatment Agent for Example 16 | 500 | 170 | Δ | Δ | Δ | Δ | Δ |

TABLE 6

| | | | Conditions | | | Evaluation Results | | | |
|---|---|---|---|---|---|---|---|---|---|
| | Metal Material | Treatment Agent No. | Coating Weight mg/m² | Temperature °C. | Hydrophilicity | Durability of Hydrophilicity | Corrosion Resistance A | Corrosion Resistance B | Adhesiveness |
| Example 17 | A4 | Treatment Agent for Example 17 | 500 | 170 | ◎ | ◎ | ◎ | ◎ | ◎ |
| Example 18 | A4 | Treatment Agent for Example 18 | 500 | 170 | ○ | ○ | ○ | ○ | ◎ |
| Example 19 | A4 | Treatment Agent for Example 19 | 500 | 170 | ○ | ○ | ◎ | ◎ | ◎ |
| Example 20 | A4 | Treatment Agent for Example 20 | 500 | 170 | Δ | Δ | Δ | Δ | ○ |
| Example 21 | A4 | Treatment Agent for Example 21 | 500 | 170 | ○ | ○ | ○ | ○ | ◎ |
| Example 22 | A4 | Treatment Agent for Example 22 | 500 | 170 | ○ | ○ | ◎ | ◎ | ◎ |
| Example 23 | A4 | Treatment Agent for Example 23 | 500 | 170 | ◎ | ◎ | ◎ | ◎ | ◎ |
| Example 24 | A4 | Treatment Agent for Example 24 | 500 | 170 | ○ | Δ | Δ | Δ | Δ |
| Example 25 | A4 | Treatment Agent for Example 25 | 500 | 170 | Δ | Δ | Δ | Δ | ○ |
| Example 26 | A4 | Treatment Agent for Example 26 | 500 | 170 | ○ | ○ | ○ | ○ | ◎ |
| Example 27 | A4 | Treatment Agent for Example 27 | 500 | 170 | ◎ | ○ | ○ | ◎ | ◎ |
| Example 28 | A4 | Treatment Agent for Example 28 | 500 | 170 | ◎ | ◎ | ◎ | ○ | ○ |
| Example 29 | A4 | Treatment Agent for Example 29 | 500 | 170 | ○ | ○ | ○ | ○ | ○ |
| Example 30 | A4 | Treatment Agent for Example 30 | 500 | 170 | Δ | ○ | Δ | ○ | Δ |
| Example 31 | A4 | Treatment Agent for Example 31 | 500 | 170 | Δ | Δ | Δ | Δ | Δ |
| Example 32 | A4 | Treatment Agent for Example 32 | 500 | 170 | ◎ | ○ | ○ | ○ | ○ |
| Example 33 | A4 | Treatment Agent for Example 33 | 500 | 170 | ◎ | ○ | ○ | ○ | ○ |
| Example 34 | A4 | Treatment Agent for Example 34 | 500 | 170 | ○ | Δ | Δ | Δ | ○ |

TABLE 7

| | | | Conditions | | | Evaluation Results | | | |
|---|---|---|---|---|---|---|---|---|---|
| | Metal Material | Treatment Agent No. | Coating Weight mg/m² | Temperature °C. | Hydrophilicity | Durability of Hydrophilicity | Corrosion Resistance A | Corrosion Resistance B | Adhesiveness |
| Example 35 | A4 | Treatment Agent for Example 35 | 500 | 170 | ○ | ○ | ○ | ○ | ○ |
| Example 36 | A4 | Treatment Agent for Example 36 | 500 | 170 | ◎ | ○ | ○ | ○ | ◎ |
| Example 37 | A4 | Treatment Agent for Example 37 | 500 | 170 | ◎ | ◎ | ◎ | ◎ | ○ |
| Example 38 | A1 | Treatment Agent for Example 38 | 500 | 170 | ◎ | ○ | ◎ | ◎ | ○ |
| Example 39 | A2 | Treatment Agent for Example 39 | 500 | 170 | ○ | ○ | ○ | ○ | ○ |
| Example 40 | A3 | Treatment Agent for Example 40 | 500 | 170 | Δ | Δ | ○ | Δ | Δ |
| Example 41 | A4 | Treatment Agent for Example 41 | 500 | 170 | ◎ | ◎ | ◎ | ◎ | ◎ |
| Example 42 | A5 | Treatment Agent for Example 42 | 500 | 170 | ◎ | ○ | ○ | ◎ | ○ |
| Example 43 | A4 | Treatment Agent for Example 43 | 100 | 170 | Δ | ○ | ○ | ○ | Δ |
| Example 44 | A4 | Treatment Agent for Example 44 | 200 | 170 | ○ | ◎ | ◎ | ◎ | ○ |
| Example 45 | A4 | Treatment Agent for Example 45 | 500 | 170 | ◎ | ○ | ○ | ◎ | ○ |
| Example 46 | A4 | Treatment Agent for Example 46 | 800 | 170 | ◎ | ○ | ○ | ○ | ○ |
| Example 47 | A4 | Treatment Agent for Example 47 | 1000 | 170 | ◎ | Δ | ○ | ○ | Δ |
| Example 48 | A4 | Treatment Agent for Example 48 | 1500 | 170 | ○ | Δ | Δ | ○ | Δ |
| Example 49 | A4 | Treatment Agent for Example 49 | 500 | 40 | ○ | Δ | Δ | Δ | Δ |

TABLE 8

| | | | Conditions | | | Evaluation Results | | | |
|---|---|---|---|---|---|---|---|---|---|
| | Metal Material | Treatment Agent No. | Coating Weight mg/m² | Temperature °C. | Hydrophilicity | Durability of Hydrophilicity | Corrosion Resistance A | Corrosion Resistance B | Adhesiveness |
| Example 50 | A1 | Treatment Agent for Example 5 | 500 | 170 | ◎ | ◎ | ○ | ○ | ◎ |
| Example 51 | A2 | Treatment Agent for Example 5 | 500 | 170 | ◎ | ◎ | ○ | ○ | ◎ |
| Example 52 | A3 | Treatment Agent for Example 5 | 500 | 170 | ◎ | ◎ | ○ | ○ | ◎ |

TABLE 8-continued

| | Conditions | | | | Evaluation Results | | | | |
|---|---|---|---|---|---|---|---|---|---|
| | Metal Material | Treatment Agent No. | Coating Weight mg/m² | Temperature ° C. | Hydrophilicity | Durability of Hydrophilicity | Corrosion Resistance A | Corrosion Resistance B | Adhesiveness |
| Example 53 | A5 | Treatment Agent for Example 5 | 500 | 170 | ⊚ | ⊚ | ⊚ | ⊚ | ○ |
| Example 54 | A4 | Treatment Agent for Example 5 | 100 | 170 | ⊚ | ○ | ○ | ○ | ⊚ |
| Example 55 | A4 | Treatment Agent for Example 5 | 200 | 170 | ⊚ | ⊚ | ○ | ○ | ⊚ |
| Example 56 | A4 | Treatment Agent for Example 5 | 800 | 170 | ⊚ | ⊚ | ⊚ | ⊚ | ○ |
| Example 57 | A4 | Treatment Agent for Example 5 | 1000 | 170 | ⊚ | ○ | ⊚ | ⊚ | ○ |
| Example 58 | A4 | Treatment Agent for Example 5 | 1500 | 170 | ⊚ | ○ | ⊚ | ⊚ | ○ |
| Example 59 | A4 | Treatment Agent for Example 5 | 500 | 40 | ⊚ | ○ | ○ | ○ | ○ |
| Example 60 | A4 | Treatment Agent for Example 5 | 500 | 60 | ⊚ | ○ | ○ | ○ | ○ |
| Example 61 | A4 | Treatment Agent for Example 5 | 500 | 80 | ⊚ | ○ | ○ | ○ | ○ |
| Example 62 | A4 | Treatment Agent for Example 5 | 500 | 100 | ⊚ | ○ | ○ | ○ | ○ |
| Example 63 | A4 | Treatment Agent for Example 5 | 500 | 130 | ⊚ | ○ | ○ | ○ | ⊚ |
| Example 64 | A4 | Treatment Agent for Example 5 | 500 | 150 | ⊚ | ○ | ⊚ | ⊚ | ⊚ |
| Example 65 | A4 | Treatment Agent for Example 5 | 500 | 200 | ⊚ | ⊚ | ○ | ⊚ | ⊚ |
| Example 66 | A4 | Treatment Agent for Example 5 | 500 | 250 | ⊚ | ○ | ○ | ○ | ○ |
| Example 67 | A4 | Treatment Agent for Example 5 | 500 | 300 | ⊚ | ○ | ○ | ○ | ○ |

TABLE 9

| | Conditions | | | | Evaluation Results | | | | |
|---|---|---|---|---|---|---|---|---|---|
| | Metal Material | Treatment Agent No. | Coating Weight mg/m² | Temperature ° C. | Hydrophilicity | Durability of Hydrophilicity | Corrosion Resistance A | Corrosion Resistance B | Adhesiveness |
| Comparative Example 1 | A4 | Treatment Agent for Comparative Example 1 | 500 | 170 | Δ | X | X | X | X |
| Comparative Example 2 | A4 | Treatment Agent for Comparative Example 2 | 500 | 170 | X | X | Δ | Δ | Δ |
| Comparative Example 3 | A4 | Treatment Agent for Comparative Example 3 | 500 | 170 | X | X | X | X | ○ |
| Comparative Example 4 | A4 | Treatment Agent for Comparative Example 4 | 500 | 170 | Δ | X | X | X | X |
| Comparative Example 5 | A1 | Zinc Phosphate Coating Film | 2000 | — | ○ | Δ | X | X | ○ |
| Comparative Example 6 | A1 | Manganese Phosphate Coating Film | 3000 | — | ○ | Δ | X | X | Δ |

(Results and Considerations)

The results of Examples 1 to 10 show that the adhesiveness between the hydrophilic coating film and the metal material surface has been further improved when the ratio ($M_D/M_C$) by mass falls within the particularly preferred range of 1.0 or more and 3.0 or less. In addition, the results of Examples 5 and 11 to 16 show that the hydrophilicity and durability of hydrophilicity of the hydrophilic coating film and the adhesiveness between the hydrophilic coating film and the metal material surface have been further improved when the average particle size of the colloidal silica (C) falls within the further preferred range of 4 nm or more and 100 nm or less. In addition, the results of Examples 5 and 17 to 19 show that vinyltriethoxysilane, aminopropyltriethoxysilane, and γ-glycidoxypropyltriethoxysilane have been preferred as the organoalkoxysilane (D) in terms of adhesiveness and corrosion resistance. In addition, the results of Examples 17 and 20 to 24 show that the adhesiveness, the corrosion resistance A, the corrosion resistance B, and the durability of hydrophilicity have been further improved when the average particle size of the inorganic particle (B) falls within the further preferred range of 50 nm or more and 500 nm or less. In addition, the results of Examples 23 and 25 to 31 show that the hydrophilicity and the corrosion resistance A have been further improved when the ratio ($M_B/M_A$) by mass falls within the further preferred range of 0.4 or more and 1.2 or less. In addition, the results of Examples 5 and 32 to 34 show that containing the zirconium compound as the component (E) have improved various types of performance, and in particular, the ammonium zirconium carbonate have achieved the best properties. In addition, the results of Examples 23 and 35 to 40 show that, in particular, the hydrophilicity has been excellent when the content of the component (E) falls within the particularly preferred range of 3 mass % or more and 30 mass % or less. In addition, the results of Examples 43 to 49 show that the water-based hydrophilizing surface treatment agent may contain one or more surfactants as the component (F), and when the content thereof falls within the further preferred range of 1 mass % or more and 20 mass % or less, the adhesiveness between the hydrophilic coating film and the metal material surface has been excellent.

The results of Examples 5 and 50 to 53 show favorable results for any of the metal materials A1 to A4. In addition, the results of Examples 5 and 54 to 58 show favorable results for any coating weight within the range of 100 mg/m² or more and 1500 mg/m² or less. In addition, the results of Examples 5 and 59 to 67 show favorable results for any heating temperature within the range of 40° C. or higher and 300° C. or lower.

Comparative Example 1 is a case of using the water-based hydrophilizing surface treatment agent containing no organoalkoxysilane (D), Comparative Example 2 is a case of using the water-based hydrophilizing surface treatment agent containing no colloidal silica (C), Comparative Example 3 is a case of using the water-based hydrophilizing surface treatment agent containing no inorganic particle (B), and Comparative Example 4 is a case of using the water-based hydrophilizing surface treatment agent containing no organic-inorganic silicon compound (A). The results in Table 9 show that the hydrophilic coating film off from practical use has been obtained in each case. In addition, Comparative Examples 5 and 6 are provided by carrying out only the chemical conversion treatment of zinc phosphate treatment or manganese phosphate treatment without forming the hydrophilic coating film according to the present invention. The results in Table 9 show that the corrosion resistance A and the corrosion resistance B are poor in each case.

The invention claimed is:

1. A water-based hydrophilizing surface treatment agent, comprising: an organic-inorganic silicon compound (A) and poorly soluble metal phosphate particles (B),
   wherein the organic-inorganic silicon compound (A) is a compound obtained by mixing a colloidal silica (C) and an organoalkoxysilane (D),
   wherein a ratio ($M_B/M_A$) between a solid content mass $M_A$ of the organic-inorganic silicon compound (A) and a solid content mass $M_B$ of the poorly soluble metal phosphate particles (B) falls within a range of 0.2 or more and 2.0 or less, and
   wherein the poorly soluble metal phosphate particles (B) have an average particle size within a range of 10 nm or more and 600 nm or less.

2. The water-based hydrophilizing surface treatment agent according to claim 1, wherein the organic-inorganic silicon compound (A) has an average particle size within a range of 3 nm or more and 500 nm or less.

3. The water-based hydrophilizing surface treatment agent according to claim 1, wherein the colloidal silica (C) has an average particle size within a range of 3 nm or more and 500 nm or less.

4. The water-based hydrophilizing surface treatment agent according to claim 1, wherein a terminal group(s) of the organoalkoxysilane (D) is one, or two or more functional groups selected from an epoxy group, an amino group, a mercapto group, an acryloxy group, an ureide group, an isocyanate group, and a vinyl group.

5. The water-based hydrophilizing surface treatment agent according to claim 1, wherein a metal contained in the metal phosphate particles is at least one selected from Zn, Fe, Mn, Al, and Ca.

6. The water-based hydrophilizing surface treatment agent according to claim 1, wherein the agent contains one or more zirconium compounds as a component (E).

7. The water-based hydrophilizing surface treatment agent according to claim 6, wherein the component (E) comprises one, or two or more metal salts selected from a nitrate, a sulfate, a carbonate, a hydrofluoric acid salt, an ammonium salt, a potassium salt, and a sodium salt.

8. The water-based hydrophilizing surface treatment agent according to claim 1, wherein the agent contains one or more surfactants as a component (F).

9. The water-based hydrophilizing surface treatment agent according to claim 8, wherein a content of the component (F) falls within a range of 1 mass % or more and 50 mass % or less to the total solid content of the agent.

10. A hydrophilic coating film, wherein the film is obtained by applying and drying the water-based hydrophilizing surface treatment agent according to claim 1.

11. A hydrophilizing surface treatment method, comprising a forming step of a hydrophilic coating film; applying the water-based hydrophilizing surface treatment agent according to claim 1 on a part or whole of a surface of a metal material, and drying the water-based hydrophilizing surface treatment agent.

12. The water-based hydrophilizing surface treatment agent according to claim 2, wherein the colloidal silica (C) has an average particle size within a range of 3 nm or more and 500 nm or less.

13. The water-based hydrophilizing surface treatment agent according to claim 2, wherein a terminal group(s) of the organoalkoxysilane (D) is one, or two or more functional groups selected from an epoxy group, an amino group, a mercapto group, an acryloxy group, an ureide group, an isocyanate group, and a vinyl group.

14. The water-based hydrophilizing surface treatment agent according to claim 2, wherein the agent contains one or more zirconium compounds as a component (E).

15. The water-based hydrophilizing surface treatment agent according to claim 2, wherein the agent contains one or more surfactants as a component (F).

* * * * *